(12) United States Patent
Campbell et al.

(10) Patent No.: US 7,228,739 B2
(45) Date of Patent: Jun. 12, 2007

(54) PRECISION FLEXURE PLATE

(75) Inventors: Ray F. Campbell, Newport Beach, CA (US); Joan D. Wada, Anaheim, CA (US); Michael J. Costello, Hermosa Beach, CA (US); Mohsen A. Khatiblou, Laguna Hills, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/996,654

(22) Filed: Nov. 23, 2004

(65) Prior Publication Data

US 2006/0107741 A1    May 25, 2006

(51) Int. Cl.
*G01P 15/125* (2006.01)
*G01P 15/00* (2006.01)

(52) U.S. Cl. .................. 73/513.32; 73/514.38
(58) Field of Classification Search ............. 73/514.23, 73/514.32, 514.36, 514.38, 514.24, 514.12, 73/514.13; 361/283.3
See application file for complete search history.

(56) References Cited

U.S. PATENT DOCUMENTS

| | | | |
|---|---|---|---|
| 2,696,566 A | 12/1954 | Lion | 307/52 |
| 2,711,590 A | 6/1955 | Wilcox | 33/366.19 |
| 3,186,101 A | 6/1965 | Wolpert | 33/366.32 |
| 3,226,981 A | 1/1966 | Mullins et al. | 73/514.32 |
| 3,290,786 A | 12/1966 | Parkin | 318/584 |
| 3,417,626 A | 12/1968 | Riordan | 73/514.13 |
| 3,746,281 A | 7/1973 | Stripling | 244/3.2 |
| 4,470,562 A | 9/1984 | Hall et al. | 244/3.2 |
| 4,507,737 A | 3/1985 | LaSarge et al. | 701/220 |
| 4,583,296 A | 4/1986 | Dell'Acqua | 33/366.12 |
| 4,601,206 A | 7/1986 | Watson | 73/510 |
| 4,792,676 A | 12/1988 | Hojo et al. | 356/622 |
| 4,912,397 A | 3/1990 | Gale et al. | 324/132 |
| 4,987,779 A | 1/1991 | McBrien | 73/514.18 |
| 5,008,774 A | 4/1991 | Bullis et al. | 73/514.13 |
| 5,031,330 A | 7/1991 | Stuart | 33/366.15 |
| 5,079,847 A | 1/1992 | Swartz et al. | 33/366.17 |
| 5,124,938 A | 6/1992 | Algrain | 702/141 |
| 5,146,417 A | 9/1992 | Watson | 702/85 |
| 5,180,986 A | 1/1993 | Swartz et al. | 324/660 |
| 5,191,713 A | 3/1993 | Alger et al. | 33/315 |
| 5,283,528 A | 2/1994 | van Seeters | 324/679 |
| 5,325,065 A | 6/1994 | Bennett et al. | 324/661 |
| 5,383,363 A | 1/1995 | Kulmaczewski | 73/510 |
| 5,415,040 A | 5/1995 | Nottmeyer | 73/514.02 |
| 5,454,266 A | 10/1995 | Chevroulet et al. | 73/514.18 |
| 5,456,111 A | 10/1995 | Hulsing, II | 73/514.32 |
| 5,461,319 A | 10/1995 | Peters | 324/660 |

(Continued)

FOREIGN PATENT DOCUMENTS

EP    585862 A1    3/1994

(Continued)

*Primary Examiner*—Hezron Williams
*Assistant Examiner*—Tamiko Bellamy
(74) *Attorney, Agent, or Firm*—Ostrager, Chong, Flaherty and Broitman

(57) ABSTRACT

A precision flexure plate includes a flat disk positioned between two capacitor plates and supported by S-shaped beams. Deflection of the disk due to gravitational loads and resulting capacitance change is used to measure the accelerations in the direction perpendicular to the disk.

5 Claims, 2 Drawing Sheets

U.S. PATENT DOCUMENTS

| | | | | |
|---|---|---|---|---|
| 5,487,305 | A | * | 1/1996 | Ristic et al. ............. 73/514.32 |
| 5,495,414 | A | | 2/1996 | Spangler et al. ............. 701/45 |
| 5,528,937 | A | * | 6/1996 | Dufour ................... 73/514.32 |
| 5,597,956 | A | | 1/1997 | Ito et al. .................. 73/514.18 |
| 5,652,384 | A | * | 7/1997 | Henrion et al. .......... 73/514.24 |
| 5,774,996 | A | | 7/1998 | Ogawa et al. ............. 33/366.12 |
| 5,777,226 | A | * | 7/1998 | Ip ......................... 73/514.24 |
| 5,801,309 | A | * | 9/1998 | Carr et al. ............... 73/514.29 |
| 5,801,313 | A | | 9/1998 | Horibata et al. ............. 73/518 |
| 5,831,164 | A | | 11/1998 | Reddi et al. ............. 73/514.01 |
| 5,861,754 | A | | 1/1999 | Ueno et al. ................. 324/660 |
| 5,905,203 | A | | 5/1999 | Flach et al. .............. 73/514.32 |
| 5,969,250 | A | | 10/1999 | Greiff ...................... 73/514.38 |
| 5,986,497 | A | | 11/1999 | Tsugai ........................ 327/554 |
| 6,128,955 | A | | 10/2000 | Mimura ........................ 73/510 |
| 6,215,645 | B1 | * | 4/2001 | Li et al. .................. 361/283.3 |
| 6,230,566 | B1 | | 5/2001 | Lee et al. ................ 73/514.32 |
| 6,293,148 | B1 | | 9/2001 | Wang et al. ............. 73/504.02 |
| 6,338,199 | B1 | | 1/2002 | Chigira et al. ................ 33/318 |
| 6,449,857 | B1 | | 9/2002 | Anikolenko ............ 33/366.11 |
| 6,467,346 | B1 | | 10/2002 | Challoner et al. ........ 73/504.02 |
| 6,609,037 | B1 | | 8/2003 | Bless et al. .................... 700/45 |
| 6,622,647 | B2 | | 9/2003 | DePoy ...................... 114/21.3 |
| 6,662,654 | B2 | | 12/2003 | Miao et al. ................... 73/488 |
| 6,688,013 | B2 | | 2/2004 | Greway ................... 33/366.21 |
| 6,701,788 | B2 | | 3/2004 | Babala ........................ 73/649 |
| 6,731,121 | B1 | | 5/2004 | Hsu et al. ................... 324/678 |
| 6,776,043 | B1 | | 8/2004 | Campbell et al. ........ 73/514.32 |
| 6,785,975 | B1 | | 9/2004 | Campbell et al. ............. 33/356 |
| 6,810,739 | B1 | | 11/2004 | Campbell et al. ........ 73/514.01 |
| 2002/0005297 | A1 | | 1/2002 | Alft et al. ..................... 175/26 |
| 2002/0190607 | A1 | | 12/2002 | Padden et al. ............. 310/328 |
| 2003/0079543 | A1 | | 5/2003 | Potter ...................... 73/514.32 |
| 2004/0239341 | A1 | * | 12/2004 | Aoyagi et al. .............. 324/661 |
| 2005/0071114 | A1 | * | 3/2005 | Nehrig ....................... 702/127 |

FOREIGN PATENT DOCUMENTS

| | | |
|---|---|---|
| JP | 06082469 A | 3/1994 |
| RU | 2191390 C2 * | 10/2002 |

* cited by examiner

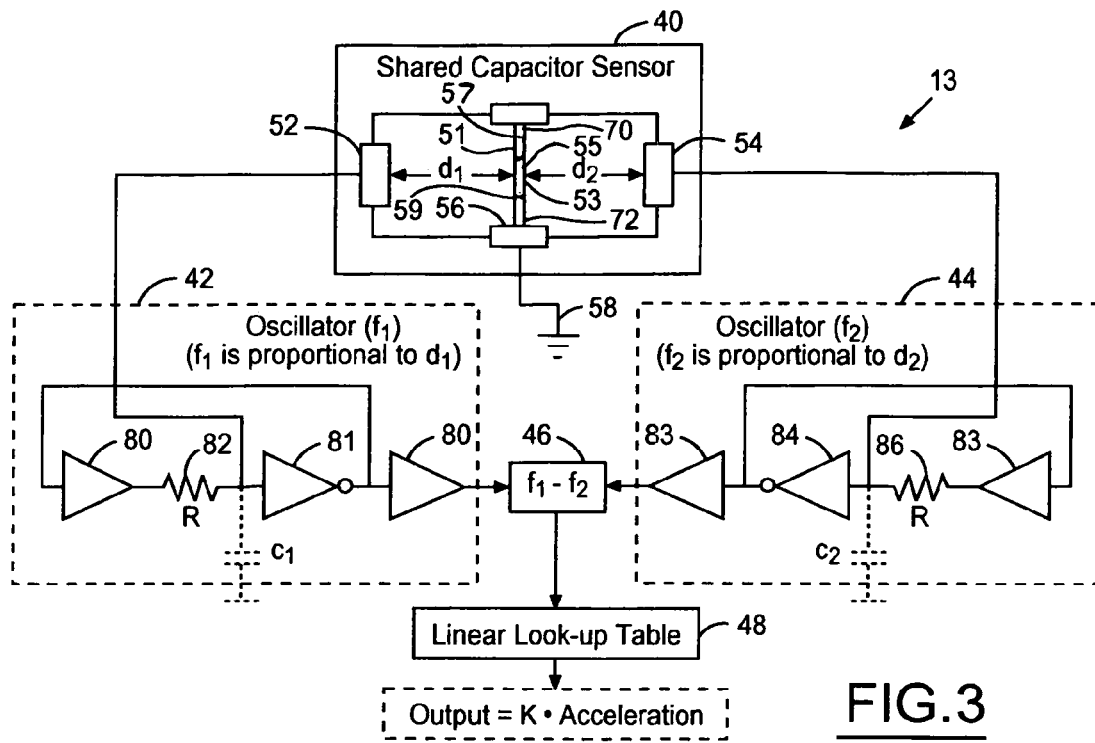
FIG.3
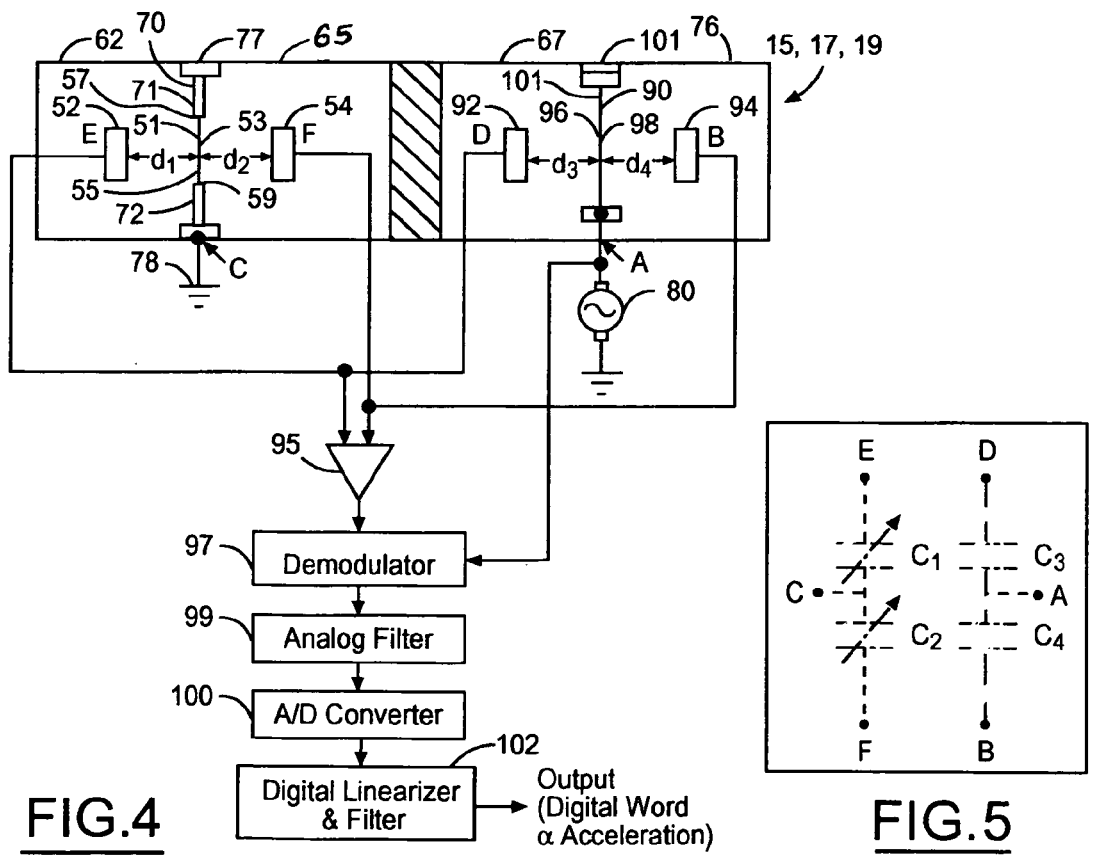
FIG.4
FIG.5

PRECISION FLEXURE PLATE

TECHNICAL FIELD

The present invention relates generally to accelerometers, and more particularly, to a precision flexure plate for a flexure accelerometer device.

BACKGROUND ART

Current systems, such as missiles, spacecraft, airplanes and automobiles, include inertial regulating systems or inertial measurement units for orienting the systems relative to the earth. Many inertial measurement units include accelerometers, such as capacitive accelerometers, for determining system inertia. It is well known that capacitive accelerometers measure the acceleration, vibration and the inclination of objects to which they are attached. In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

As was mentioned, this type of accelerometer can be used in aerospace inertial measurement units or in a portion of an aircraft or spacecraft navigation or guidance system. Accordingly, the temperature in the operating environment of the accelerometer changes over a wide range. Consequently, acceleration must be measured with a high accuracy over a wide range of temperatures and temperature gradients. This is often a difficult process.

Additionally, missile systems require a high degree of accuracy regarding angular and linear acceleration measurements. Improvements in this regard are constantly being sought out.

The disadvantages associated with current accelerometer systems have made it apparent that a new accelerometer system is needed. The new accelerometer system should substantially minimize temperature sensing requirements and should also improve acceleration detection accuracy. The present invention is directed to these ends.

SUMMARY OF THE INVENTION

In accordance with one aspect of the present invention, a precision flexure plate includes a flat disk positioned between two capacitor plates and supported by S-shaped beams. Deflection of the disk due to gravitational loads and resulting capacitance change is used to measure the accelerations in the direction perpendicular to the disk.

One advantage of the present invention is that it generates a dynamic range and granularity sufficient for Inter-Continental Ballistic Missile (ICBM) usage. Moreover, the accelerometer consumes less power than current accelerometers, while dramatically improving reliability.

The inertial measurement unit system generates reliable angular and linear acceleration measurements. These measurements are accurate to the degree required by missile systems and will therefore provide a dramatic improvement in reliability and manufacturing costs.

Another advantage is that it is not substantially affected by changes in temperature or temperature gradients. The flexure configuration reduces the temperature sensitivity, thereby enhancing the signal-to-noise ratio.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 3 illustrates an accelerometer system of FIG. 1 in accordance with another embodiment of the present invention;

FIG. 4 illustrates an accelerometer system of FIG. 1 in accordance with another embodiment of the present invention; and FIG. 5 illustrates an equivalent capacitor system of FIG. 4.

DETAILED DESCRIPTION OF THE INVENTION

The present invention is illustrated with respect to an aerospace system 10, particularly suited to the aerospace field. The present invention is, however, applicable to various other uses that may require accelerometers, such as any system requiring position and velocity measurements under extreme conditions, as will be understood by one skilled in the art.

Figure 1:
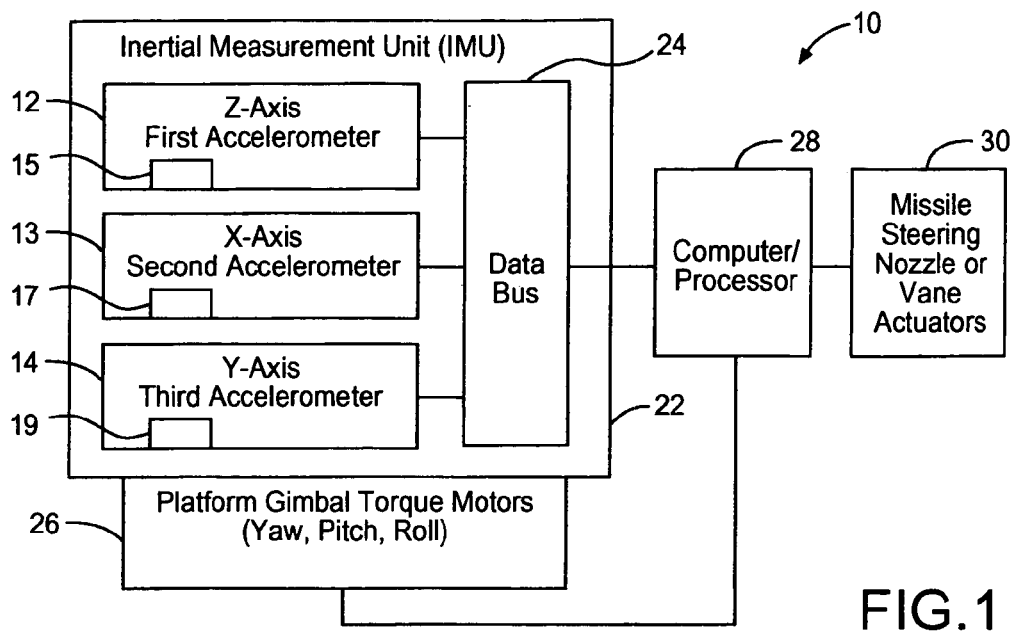
FIG. 1 illustrates an aerospace system including an accelerometer system in accordance with one embodiment of the present invention.

Referring to FIG. 1, the system 10, which is an aerospace, accelerometer system for controlling inertia, includes an inertial measurement unit 22 having three accelerometer gimbals/axes 12, 13, 14 (first, second, and third) respectively. Each of the gimbals includes precision flexure plate accelerometers 15, 17, 19, which will be discussed in detail later. The aerospace system 10 is merely an illustrative example of an accelerating object and is not meant to be limiting. For example, the present inertial measurement unit 22 could be implemented in any accelerating object to sense acceleration forces, including any type of vehicle or missile system, such as a Minuteman III missile system or a tactical missile system.

Further, the system 10 may be configured with precision flexure plates included in any of the following flexure plate devices: a flexured plate dual capacitance accelerometer, a variable capacitance bridge accelerometer, a capacitance acceleration derivative detector, a dual flexure plate angular accelerometer, a single plate capacitive acceleration derivative detector, a dual bridge flexure plate angular accelerometer, an angular and linear flexured plate accelerometer, a dual bridge angular and linear accelerometer, an accelerometer augmented leveling device, an accelerometer augmented compass, a quad flexured plate level detector, a flexured plate capacitive compass, a capacitive balance leveling device, an integrated capacitive bridge inertial measurement unit, an integrated flexure functions inertial measurement unit, and an extended accuracy flexured plate dual capacitance accelerometer. All of the aforementioned devices may include the precision flexure plate of the present invention described in detail regarding FIG. 2.

The illustrated aerospace system 10 includes the previously mentioned inertial measurement unit 22 and a data bus 24 and further includes gimbal and torque motors 26, a computer or processor 28, and missile steering nozzle or vane actuators 30.

The inertial measurement unit accelerometer gimbals 12, 13, 14 defining the z-, x-, and y-axes are coupled to the platform (including gimbal and torque motors 26 (yaw, pitch and roll motors)). The accelerometer gimbals 12, 13, 14 are also coupled to the data bus 24, which transfers information to the computer/processor 28. The processor 28 is coupled to the missile steering nozzle (or vane actuators) unit 30 and the gimbal torque motors 26.

All accelerometers are assumed to be on an inertial platform 26 utilizing generated signals to maintain an essentially zero rotation about all three axes. This control will be provided by the processor 28, which can compute signals and drive the motors on the platform 26 and select the required mode and provide the output data required by the system 10. The platform 26 may be a gimbal or alternate inertial platform design known in the art. The system 10 utilizes the generated signals from the accelerometers to control the platform position to maintain a near zero rotation. The platform 26 may also include gimbal torque motors controlling the yaw, pitch, and roll gimbals, z-, x-, and y-axis gimbals 12, 13, 14.

In one embodiment of the present invention, such as when the system 10 includes a leveling device, each axis gimbal 12, 13, 14 may include multiple accelerometers and an angular readout device to detect the current angular position with respect to the platform 26. The angular readout device may be an electrical resolver, an optical encoder, a mechanical interface or any of a wide range of devices capable of determining the angle to the accuracy required by the system 10.

The platform 26 may also include, mounted as an integral part, a gyrocompass, which will generate an output indicating the magnitude of the velocity vector through the xz-plane. When the plane of the platform 26 is level and local gravity is perpendicular thereto, the gyrocompass may be rotated 360° in order to establish the east-west direction of the rotation of the earth. This reference may be utilized for initial conditions for inertial measurement unit gimbal readouts.

The accelerometer includes a first capacitor plate (first plate), a second capacitor plate (second plate), and a precision flexure plate 55 (central plate) positioned between the first and second plates. To maintain the capacitances between the central plate 55 and to maintain the first and second plates insensitive to changes in temperature, a constant ratio A/d is maintained where A is the area of the plates and d is separation between the central plate 55 and either the first or second plate.

Figure 2:
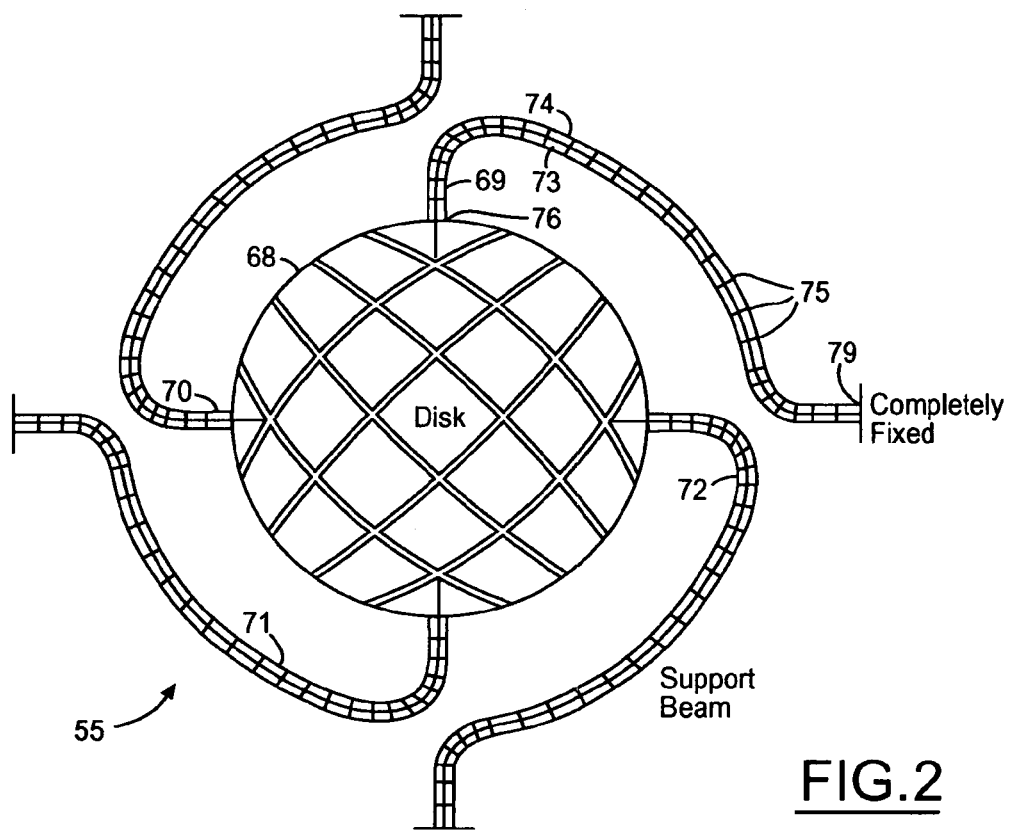
FIG. 2 illustrates a precision flexure plate from the accelerometer system of FIG. 1.

FIG. 2 illustrates the precision flexure plate 55 in accordance with another embodiment of the present invention. One embodiment of the flexure plate 55 includes a flat disk 68 positioned between two capacitor plates (illustrated in FIGS. 3 and 4) and supported by S-shaped beams (support beams 69, 70, 71, 72). Deflection of the disk 68 due to gravitational loads and resulting capacitance change is used to measure the accelerations in the direction perpendicular to the disk 68. The design of this disk-beam system may include the following parameters: 1. deflection of this plate 55 should be large enough to be detectable at low G levels and not to be excessive at high G levels; 2. Deflection should be temperature independent; 3. First natural frequency shall be above a specified level; and 4. Distortion of the disk 68 may be very small compared to deflection of the beams 69, 70, 71, 72.

The present invention is illustrated with four support beams 69, 70, 71, 72, first, second, third, and fourth; however, numerous numbers of support beams may also be included in accordance with the present invention. For example, the present invention may include a single support beam or a plurality of support beams. Each support beam is illustrated as including an S-shaped curve meaning that the support beams include at least two curves or arcs. Further, each support beam 69, 70, 71, 72 includes an inner beam portion 73 and an outer beam portion 74 such that temperature change of the support beam results in expansion or contraction of the outer and inner beam portions. The support beams 69, 70, 71, 72 may include a continuous material or a plurality of adjacent joints 75, which allow contraction and expansion of the material while limiting possible material stress fractures.

Each of the support beams 69, 70, 71, 72 includes two ends 76, 79 and is coupled to the flexure disk 68 at one end 76 and is fixed at the other end 79 to, for example, an acceleration sensor housing structure.

The support beams 69, 70, 71, 72 and the disk 68 or flexure plate may include the same material or different materials. One material that functions well for the purposes of the present invention is elgiloy®; however numerous other robust substances may also be used in accordance with the present invention. The disk 68 or plate may be a flexure plate or a proof mass, such that system flexure occurs in the plate 68, in the support beams 69, 70, 71, 72, or in both.

The temperature independency of the deflection is a unique feature of the present invention. The bending stiffness of these uniquely shaped support beams 69, 70, 71, 72 do not change with temperature because there are little or no axial loads; and the resulting stiffening or softening, depending on the temperature, therefore develops. Change in temperature and accompanying length change of the beams only results in small rotation of the disk 68 about its vertical rotational axis. Additionally, there is little or no coupling between the axial deflection and lateral loads, meaning that little or no axial movement will occur as a result of lateral accelerations. The above dimensional constraints may be implemented using a commercial finite element code with both geometry and property optimization capabilities.

Any undesirable effects of transient spikes and the accompanying oscillations can be minimized by immersing the disk 68 in a fluid.

In an alternate embodiment of the present invention, a composite structure encloses the precision flexure plate 55. The composite structure includes a support structure, including a material having a coefficient of thermal expansion, and a capacitor plate, including a second material having a different coefficient of thermal expansion. The support structure includes two ends such that an insulator is coupled to one end. The capacitor plate is coupled to the insulator and surrounded by the support structure. The second material is also included in the precision flexure plate, which is disposed in substantially parallel relation to the capacitor plate. The precision flexure plate is coupled to the support structure, whereby the precision flexure plate and the capacitor plate define a distance. The distance varies in response to acceleration forces acting upon the precision flexure plate, thereby generating a capacitance signal.

Referring to FIGS. 2 and 3, an example of a possible configuration for the accelerometer 15 is included as an illustrative example of the three accelerometers 15, 17, 19. The accelerometer 15 is part of an inertial measurement unit 22 (IMU), as was previously discussed. The inertial measurement unit 22 includes a shared capacitor sensor 40, two oscillators 42, 44, a frequency subtraction device 46, and a Linear Lookup Table (LLT) or linearizer 48.

The shared capacitor sensor 40 includes a single precision flexure plate 55, two parallel capacitor plates 52, 54, and a metal housing structure 56. The shared capacitor sensor 40 generates capacitance signals in response to acceleration of the aeronautical system 10, as will be discussed later.

The precision flexure plate 55 includes a first side 51, a second side 53 and a common edge 57 or 59. The precision flexure plate 55 is positioned between the two capacitor plates 52, 54 such that the first fixed plate 52 is a first distance ($d_1$) from a first side 51, and the second capacitor plate 54 is a second distance ($d_2$) from a second side 53 of the precision flexure plate 55. The precision flexure plate 55 is affixed to the metal housing structure 56 and is also coupled to a ground 58.

In the present embodiment, the disk 68 of the precision flexure plate 55 is circular and coupled to the housing 56 through four beams 70, 71, 72, 73. The beams of the precision flexure plate 55 are rigidly fixed to the metal housing structure 56 through almost any manner known in the art. Resultantly, all the system flexure is generated within the disk 68 and the support beams 69, 70, 71, 72. The connection arrangement generally increases reliability and robustness of the system 10. This, however, generates a non-linear output from the precision flexure plate 55, which will be discussed regarding the linear lookup table linearizer 48.

A gas, vacuum, or liquid environment is enclosed within the sensor 40 through the metal housing structure 56 such that there is no interference with the movement of the precision flexure plate 55 other than the acceleration of the system 10 along a perpendicular axis. During acceleration, the precision flexure plate 55 flexes according to the reaction force of Newton's second law of motion, force=mass× acceleration (F=ma), causing the distance between the precision flexure plate 55 and the capacitor plates 52, 54 to vary, thus creating the two variable capacitors, one on each side of the precision flexure plate 55.

The combination of the first capacitor plate 52 and the precision flexure plate 55 forms a first parallel plate capacitor, and the combination of the second capacitor plate 54 and the precision flexure plate 55 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $C \cong (\epsilon_0 A)/d$, where $\epsilon_0$ is the permittivity constant, A is the area of a capacitor plate 52 or 54 (if l is the length of one side and the cross section of the plate is square, then $A=l^2$) and d is the effective distance between the precision flexure plate 55 and one of the capacitor plates 52, 54.

The first capacitor plate 52 is coupled to the metal housing structure 56 and positioned a first distance ($d_1$) from the precision flexure plate 55. The first capacitor plate 52 and the precision flexure plate 55 form a first capacitor whose operation is also governed by the equation $C \cong (\epsilon_0 A)/d$. The capacitance of the first capacitor plate 52 responds to movement of the precision flexure plate 55 when $d_1$ either increases or decreases, thereby generating a first capacitance signal.

The second capacitor plate 54 is also coupled to the metal housing structure 56 and positioned a first distance ($d_1$) from the precision flexure plate 55. The second capacitor plate 54 and the precision flexure plate 55 form a second capacitor whose operation is governed by the equation $C \cong (\epsilon_0 A)/d$. The second capacitor plate 54 responds to movement of the precision flexure plate 55 when $d_2$ either increases or decreases, thereby generating a second capacitance signal.

The distances ($d_1$ and $d_2$) between the precision flexure plate 55 and the capacitor plates 52, 54 are a function of acceleration and are proportional or equal when the system 10 is at rest. Each capacitor plate 52, 54 is connected to a respective oscillator 42, 44, which generates the capacitance necessary for predictable oscillation.

The first capacitor plate 52 is coupled to the first oscillator 42, and the second capacitor plate 54 is coupled to the second oscillator 44. The two oscillators 42, 44 are coupled to a frequency subtraction device 46, and the frequency subtraction device 46 is coupled to the linear lookup table 48, which is coupled to a processor 28 (missile operations processor). The processor 28 is coupled to an actuator 30, and to various system components, as well as thrusters and attitude control devices.

The oscillators 42, 44 are ideally precision designs utilizing GaAs or similar material. The oscillators 42, 44 are also mounted on the metal housing structure 56 in the present embodiment.

The embodied first oscillator 42 includes components well known in the art. Although the embodied oscillator is a common oscillator type, one skilled in the art will realize that numerous other types of oscillators will also be adaptable for the present invention. The various components include, but are not limited to, two buffers 80, an inverter 81, and at least one resistor 82. The first oscillator 42 receives the capacitance signal from the first capacitor plate 52 and generates therefrom a frequency signal ($f_1$), which is inversely proportional to $d_1$.

The second oscillator 44 receives the capacitance signal from the second capacitor plate capacitor and generates therefrom a second frequency signal ($f_2$), which is inversely proportional to $d_2$. The embodied oscillator 44 is similar to the first oscillator 42 and also includes a set of buffers 83, an inverter 84, and at least one resistor 86.

The frequencies ($f_1$ and $f_2$) are functions of the distances ($d_1$ and $d_2$) respectively. As the precision flexure plate 55 flexes, one capacitor increases and the other decreases, thereby causing one oscillator 42 to increase output frequency and the other oscillator 44 to decrease output frequency.

The frequency subtraction device 46 receives the oscillator signals ($f_1$ and $f_2$) and generates the difference thereof, i.e., $f_1-f_2$. Important to note is that the polarities of both $f_1$ and $f_2$ are determined before this difference is calculated. A resultant frequency signal is generated from the frequency subtraction device 46.

A linearizer 48 or linear lookup table receives the overall frequency signal. The linearizer 48 compensates for both the nonlinear function generated from the frequency subtraction device 46 and any manufacturing anomalies, as will be understood by one skilled in the art. The linearizer 48 value is established in manufacturing through taking large samples of performance curves, as will be understood by one skilled in the art. The linearizer 48 output is a digital word whose magnitude is proportional to the acceleration of the system 10 in either direction along an axis perpendicular to the precision flexure plate 55.

Numerous alternate linearizers are also included in the present embodiment whereby a substantially linear function can be generated by compensating for nonlinear functions, for example, in the digital domain, a digital linearizer is included. The output of the linearizer 48 is an acceleration signal multiplied by a constant (k).

Statistical filtering of the linearized data somewhere significantly above the maximum flexure frequency also occurs in either the linearizer 48 or the processor 28 to reduce the overall noise impact on the system 10.

The processor 28 receives the output signals and generates a processor signal and response thereto. The processor 28 is embodied as a typical missile or airplane processor, as is familiar in the art.

The processor 28 accepts the output of each accelerometer pair and applies the compensation and calibration corrections derived from manufacturing and the earth rate calibration scheme. The actuator, here embodied as missile steering nozzle or vane actuators 30 receives processor signals and activates system components (e.g., object control devices) in response thereto. System components include for example, thrusters or attitude control devices.

Referring to FIGS. 4 and 5, a bridge accelerometer in accordance with FIG. 1 is illustrated. Each bridge accelerometer or variable capacitance bridge accelerometer within the integrated accelerometer system 10 is a single axis accelerometer that generates a robust wide dynamic range of performance.

The accelerometer will be described as an illustrative example of the accelerometers in this embodiment. The accelerometer is part of the inertial measurement unit 22 and includes a housing 77, a flexured plate section 65, a rigid plate section 67, a ground 78, an AC source 93, a differential amplifier 95, a demodulator 97, an analog filter 99, an analog-to-digital converter 100, and a digital linearizer and filter 102.

The housing 77 or metal housing structure encloses four capacitors, which will be discussed later. A gas or vacuum environment is also enclosed therein such that there is no interference with the movement of the precision flexure plate 55 other than the acceleration of the system 10 along a perpendicular axis.

The flexured plate section 65 includes a single precision flexure plate 55 and two parallel capacitor plates 52, 54. The rigid plate section 67 includes a rigid plate 90 and two capacitor plates 92, 94. The two sections are electrically isolated and enclosed in a metal housing structure 77.

In the present embodiment, the disk 68 of the precision flexure plate 55 is coupled to the housing structure 77 through four beams 69–72. The precision flexure plate 55 includes a first side 51, a second side 53 and a common edge 57.

The precision flexure plate 55 is positioned between the first and second capacitor plates 52, 54 such that the first capacitor plate 52 is a first distance ($d_1$) from the first side 51 and the second capacitor plate 54 is a second distance ($d_2$) from the second side 53 of the precision flexure plate 55. The disk 68 of the precision flexure plate 55 is affixed to the housing structure 56 through any or all of the beams 69–72 of the precision flexure plate 55 and is also coupled to a ground 78.

The beams 69–72 of the precision flexure plate 55 are rigidly fixed to the metal housing structure 77 through almost any manner known in the art. Resultantly, all the system flexure is generated within the precision disk 68 and beams 69–72 of the flexure plate 55 along a flex axis (for the first accelerometer 15 this is a first flex axis, for the second accelerometer 14, this is a second flex axis). This generally increases reliability and robustness of the system 10. This, however, generates a non-linear output from the precision flexure plate 55, which will be discussed regarding the linearizer 102.

The combination of the first capacitor plate 52 and the precision flexure plate 55 forms a first parallel plate capacitor, and the combination of the second capacitor plate 54 and the precision flexure plate 55 forms the second parallel plate capacitor. The equivalent capacitor for the first parallel plate capacitor is illustrated in FIG. 5 in broken lines as $C_1$, and the equivalent capacitor for the second parallel plate capacitor is illustrated in broken lines as $C_2$.

The capacitance of the parallel plate capacitors is determined by the following: $C \cong (\epsilon_0 A)/d$, where $\epsilon_0$ is the permittivity constant, A is the area of a capacitor plate 52 or 54, and d is the effective distance between the precision flexure plate 55 and one of the capacitor plates 52, 54.

The first capacitor plate 52 is coupled to the metal housing structure 77 and positioned a first distance ($d_1$) from the precision flexure plate 55. The first capacitor plate 52 and the precision flexure plate 55 form a first capacitor whose operation is also governed by the equation $C \cong (\epsilon_0 A)/d$. The first capacitor plate 52 responds to movement of the precision flexure plate 55 when $d_1$ either increases or decreases, thereby generating a first capacitance signal.

The second capacitor plate 54 is also coupled to the metal housing structure 77 and positioned a second distance ($d_2$) from the precision flexure plate 55. The second capacitor plate 54 and the precision flexure plate 55 form a second capacitor whose operation is governed by the equation $C \cong (\epsilon_0 A)/d$. The second capacitor plate 54 responds to movement of the precision flexure plate 55 when $d_2$ either increases or decreases, thereby generating a second capacitance signal.

The distances ($d_1$ and $d_2$) between the precision flexure plate 55 and the capacitor plates 52, 54 are a function of acceleration and are proportional or equal when the system 10 is at rest.

During acceleration, the precision flexure plate 55 flexes according to the reaction force of Newton's second law of motion, force=mass×acceleration (F=ma), causing the distance between the precision flexure plate 55 and the capacitor plates 52, 54 to vary, thus creating the two variable capacitors $C_1$, $C_2$, one on each side of the precision flexure plate 55.

For the rigid plate section 67, which is insulated from the flexured plate section 65, the rigid plate 90 is positioned between the third capacitor plate 92 and fourth capacitor plate 94 such that the third capacitor plate 92 is a third distance ($d_3$) from a first side 96 and the fourth capacitor plate 94 is a fourth distance ($d_4$) from a second side 98 of the rigid plate 90. The rigid plate 90 is coupled to an insulator 101 through at least a portion of at least one common edge of the first side 96 and the second side 98 of the rigid plate 90, and the insulator 101 is affixed to the metal housing structure 77. The third and fourth capacitor plates 92, 94 are coupled to the housing 77.

In the present embodiment, the rigid plate 90 is coupled to the housing 77 through an insulator at only one edge 103. However, numerous other attachment points are included, as will be understood by one skilled in the art.

The combination of the third capacitor plate 92 and the rigid plate 90 forms a third parallel plate capacitor, and the combination of the fourth capacitor plate 94 and the rigid plate 90 forms the fourth parallel plate capacitor. The equivalent capacitor for the third parallel plate capacitor is illustrated in broken lines in FIG. 5 as $C_3$, and the equivalent capacitor for the fourth parallel plate capacitor is illustrated in broken lines as $C_4$.

The first and second capacitors are formed on each side of the precision flexure plate 55 and the third and fourth capacitors are formed on either side of the rigid plate 90. The four capacitors are electrically connected to form a bridge. The fixed capacitors (third and fourth) and rigid plate 90 are isolated from the flexured plate 55 and flexured plate capacitors (first and second). All capacitors are designed to be as nearly equal as possible when at rest.

The distance between the precision flexure plate 55 and the rigid plate 90 is a function of acceleration. The center of each bridge side (ED and BF in FIGS. 4 and 5) is monitored to detect the differential amplitude. As the precision flexure plate 55 flexes in response to acceleration, one capacitor increases and the other decreases, thereby increasing the bridge voltage on one side and decreasing bridge voltage on the other.

The bridge is excited with an AC source 93 at one end (A) and grounded at the other end (C). The ground 78 is coupled to the precision flexure plate 55 and the AC source 93 is coupled to the rigid plate 90. The two capacitive legs (ADEC) and (ABFC) of the bridge produce two voltage dividers, each of which provides a terminal (ED, BF), illustrated in FIG. 5, to measure the resulting voltage.

The bridge configuration reduces the temperature sensitivity and the AC excitation allowing narrow band analog filtering, both of which enhance the signal-to-noise ratio. The bridge circuitry utilizes GaAs or high speed CMOS, as the accuracy required for performance will require low propagation delays. In one embodiment, the bridge circuitry is mounted on a heated housing structure. In addition, the entire system includes a precision heating device (not illustrated) and sufficient mass to reduce gradients in the bridge in one embodiment.

The voltage phase gives direct indication of the direction of acceleration. This output is gain adjusted if required in the differential amplifier 95, and received in the demodulator 97, which rectifies the waveform as a function of the reference excitation phase from the AC source 93. The resulting waveform is then filtered in the analog domain in the analog filter 99 and received in an analog-to-digital converter 100 where the data becomes a digital word.

The digital word is then filtered and linearized in the digital linearizer and filter 102 for manufacturing and flexure non-uniformities. This output is a digital word having a magnitude proportional to the acceleration of the system in either direction along the perpendicular axis.

In other words, the linearizer 102 receives the overall digital word signal. The linearizer 102 compensates for both the nonlinear function generated from the analog-to-digital converter 100 and any manufacturing anomalies, as will be understood by one skilled in the art. The linearizer 102 value is established in manufacturing through taking large samples of performance curves, as will be understood by one skilled in the art. The linearizer 102 output is a digital word whose magnitude is proportional to the acceleration of the system 10 in either direction along an axis perpendicular to the precision flexure plate 55.

Numerous alternate linearizers are also included in the present embodiment whereby a substantially linear function can be generated by compensating for nonlinear functions, for example, in the digital domain, a digital linearizer is included. The output of the linearizer 102 is an acceleration signal multiplied by a constant (k).

Statistical filtering of the linearized data somewhere significantly above the maximum flexure frequency also occurs in either the digital linearizer and filter 102 or the processor 28 to reduce the overall noise impact on the system 10. The compensation for the non-linearity of the flexure structure and overall transport error is compensated for by the linearizer and filter 102 whose values are established in manufacturing through sampling performance curves.

The processor 28 receives the acceleration signal multiplied by the constant and generates a computer signal and response thereto. The processor 28 is embodied as a typical missile or airplane computer, as is familiar in the art.

The missile steering nozzle or vane actuators 30 receive the computer signal and activate the gimbal torque motors 26 or object control devices in response thereto.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A precision flexure plate system comprising:
a housing;
a first capacitor plate fixed within said housing; and
a precision flexure plate disposed in substantially parallel relation to said first capacitor plate and a first distance therefrom, said precision flexure plate comprising a disk and a first support beam defining at least two curves, said first support beam further comprising a first end and a second end, wherein said first end is coupled to said disk and said second end is coupled to said housing, wherein said first distance varies in response to acceleration forces acting upon said precision flexure plate thereby generating a first capacitance signal;
wherein said disk and said first support beam comprise a same material and have a same coefficient of thermal expansion and said first support beam comprises a plurality of adjacent joints, which allow the contraction and expansion; wherein said precision flexure plate is immersed in a fluid or gas or enclosed in a vacuum and wherein the natural frequency of oscillation of said precision flexure plate is above a predetermined level; further comprising a second support beam, wherein said disk is coupled to said housing through said second support beam; further comprising a second capacitor plate, said second capacitor plate coupled to said housing wherein said second capacitor plate is spaced apart from and in parallel relation to said first capacitor plate and is further spaced a second distance from said precision flexure plate; wherein said second distance varies in response to acceleration forces acting upon said precision flexure plate thereby generating a second capacitance signal; further comprising a first oscillator receiving first capacitance signal and generating a first frequency signal in response thereto; further comprising a second oscillator receiving said second capacitance signal and generating a second frequency signal in response thereto; and a frequency subtraction device subtracting said second frequency signal from said first frequency signal and generating therefrom an overall frequency signal; further comprising a linearizer receiving said overall frequency signal and generating therefrom a linearized acceleration signal.

2. The system of claim 1 further comprising an actuator adapted to activate a system component in response to said linearized acceleration signal, wherein said system component comprises a thruster or an attitude control device.

3. The system of claim 1 further comprising a second support beam defining at least two curves, a third support beam defining at least two curves, a fourth support beam defining at least two curves, wherein said disk is coupled to said housing through said second support beam, said third support beam, and said fourth support beam.

4. The system of claim 1, wherein said acceleration forces distort said disk by a small amount relative to distortion of said first support beam.

5. The system of claim 1, wherein said first support beam includes an inner beam portion and an outer beam pardon such that temperature change causes said inner beam portion to move relative to said outer beam portion.

* * * * *